United States Patent [19]

Shinjo

[11] 4,153,989
[45] May 15, 1979

[54] AUTOMATIC PIERCING NUT ASSEMBLING ARRANGEMENT

[75] Inventor: Katsumi Shinjo, Osaka, Japan

[73] Assignee: Yugenkaisha Shinjo Seisakusho, Japan

[21] Appl. No.: 859,593

[22] Filed: Dec. 12, 1977

[30] Foreign Application Priority Data

Dec. 11, 1976 [JP] Japan .................................. 51-166295

[51] Int. Cl.² .......................... B23P 11/00; B23Q 7/10
[52] U.S. Cl. ......................................... 29/706; 29/798; 29/809; 29/818
[58] Field of Search ................ 29/432, 509, 765, 798, 29/809, 818, 706, 707, 708, 720

[56] References Cited

U.S. PATENT DOCUMENTS

| | | | |
|---|---|---|---|
| 3,089,360 | 5/1963 | Steward | 78/46 |
| 3,108,368 | 10/1963 | Steward | 29/798 X |
| 3,946,479 | 3/1976 | Goodsmith et al. | 29/798 |
| 3,969,808 | 7/1976 | Goodsmith et al. | 29/798 |

Primary Examiner—E. M. Combs
Attorney, Agent, or Firm—Craig & Antonelli

[57] ABSTRACT

An automatic piercing nut assembling arrangement mounted at a ram of a press together with ordinary stamping dies and/or other assembling arrangements of the same type. A device is provided for temporarily suspending an automatic supply of piercing nuts to the assembling arrangement when it is necessary to suspend the operation of the press ram and/or press due to working conditions in the other devices on the press ram and/or the press. The device is effective so as to cause a punch of the automatic piercing nut assembling arrangement to physically block the piercing nuts so as to prevent the piercing nuts from entering a feed path of the punch.

21 Claims, 6 Drawing Figures

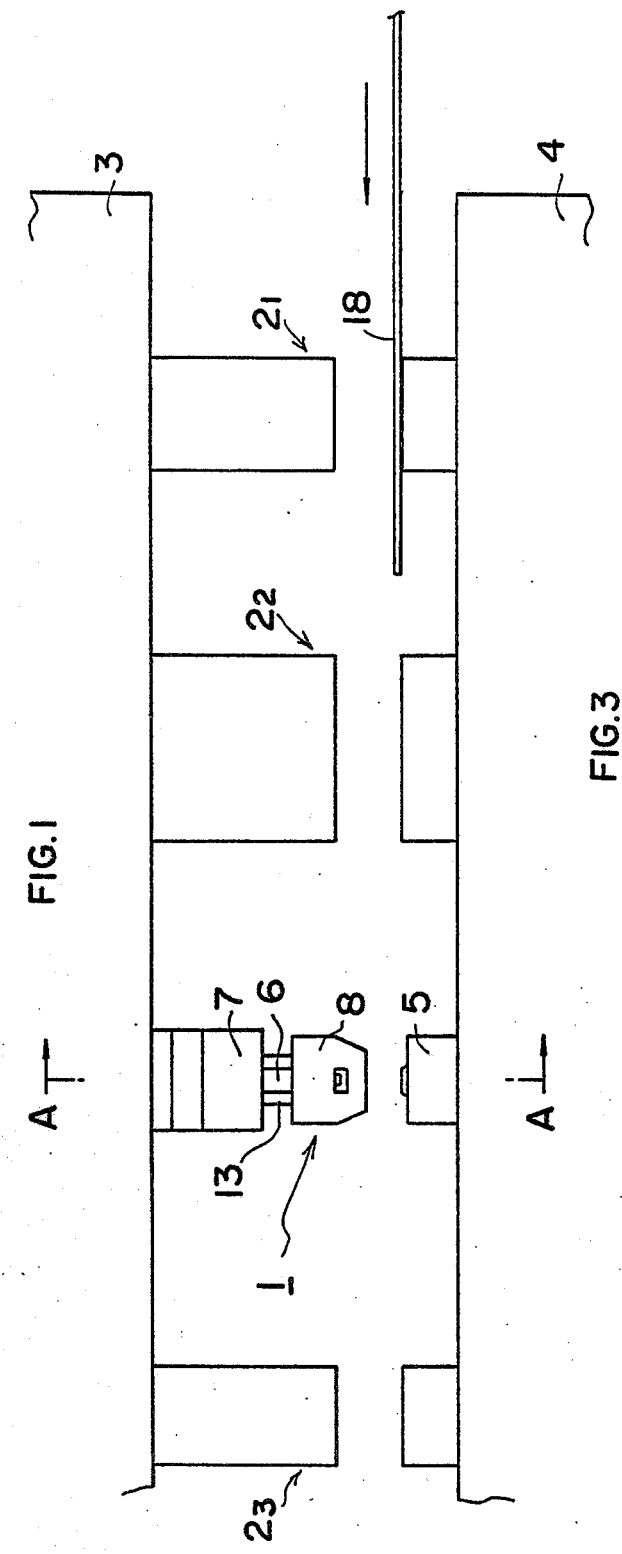
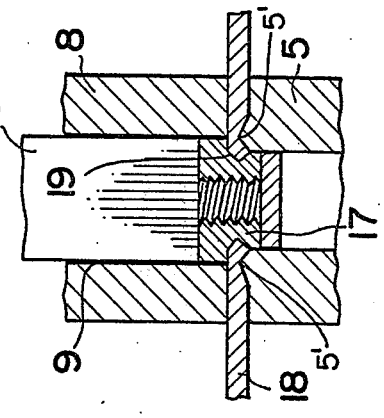

AUTOMATIC PIERCING NUT ASSEMBLING ARRANGEMENT

The present invention relates to an automatic assembling arrangement and, more particularly, to an automatic self-piercing nut assembling arrangement for effecting an assembly of a self-piercing nut and a metal panel by causing the piercing nut to punch an installation aperture in a metal panel placed on a swaging die by pressure exerted on the piercing nut by a punch and/or a ram of a press or pressing machine.

It is generally known from U.S. Pat. Nos. 2,707,322, 3,152,628, 3,187,796, 3,704,507 and commonly owned U.S. patent application Ser. No. 325,049, that a piercing nut or clinch nut has a square pilot portion around a central threaded opening for a screw, which pilot portion serves as a punch against a metal panel with flanges extending outwardly from the opposite sides of the pilot portion, which flanges assure the anchorage of the piercing nut in support of the metal panel thereon. Ordinarily, shallow grooves are undercut between the pilot portion and the flanges. Additionally, the pilot portion is provided with shoulders which function as piercing edges against the metal panel when used as a punch with the shoulders extending in parallel to top surfaces of the flanges. The grooves are aimed to receive a swaged metal around the nut installation aperture punched by the pilot portion of the nut, thus enabling the nut to anchor to the panel.

Normally, a piercing nut assembly arrangement is mounted on a ram of a press or pressing machine along with other devices such as, for example, ordinary stamping dies, and at least one other assembly arrangement of the same type. In operation, the piercing or clinch nuts are automatically supplied from a supply source or container to the assembly arrangement by way of a supply chute which extends over a relatively long distance from the supply source to the assembling arrangement. The piercing or clinch nuts are individually delivered between a punch and swaging die of the assembling arrangement in a timed relationship in accordance with an upward and downward movement of the press ram. The piercing or clinch nuts are forced into the metal pane one-by-one by virtue of the pressure exerted by the punch.

In practical manufacturing operations, it often happens that one or more of the other devices mounted on the press ram require a temporary suspension of operation such as, for example, to replace a stamping die with a new one or adjust the position of one or more of the stamping dies. Upon suspension of operation, it is also necessary to stop the delivery of piercing or clinch nuts to the working space in the assembling arrangement until a normal working condition is restored on the device for which the operation was suspended.

The aim underlying the present invention essentially resides in providing an improved automatic piercing nut assembling arrangement of the afore-mentioned type which incorporates therein a means for temporarily suspending or stopping a supply of the piercing nuts to the assembling arrangement when required due to a working condition of another device mounted on the ram of the press.

According to one advantageous feature of the present invention, means are provided for changing a position of a punch of the assembling arrangement relative to a piercing or clinch nut so that a delivery of the piercing or clinch nut to a working space of the punch is blocked by the punch per se, thereby enabling the piercing or clinch nut to be kept free from a punching action by the punch.

According to a further advantageous feature of the present invention, a nut holding block is provided in which a piercing or clinch nut is accommodated with the piercing or clinch nut being pressed by the punch against a metal panel with the position changing means adjusting the nut holding block by raising the same, thereby ensuring that the piercing or clinch nut is obstructed and prevented from being delivered to a feed path of the punch.

According to the present invention, the position changing means includes a locking means having a locking pin displaceably mounted in a punch holder with the locking pin cooperating with a stepped recess provided in a guide post for the holding block. The stepped recess defines two upper limits of the holding block relative to the punch so that with the locking pin set at the first upper limit, the punch is able to press the piercing or clinch nuts into the metal plate, whereas in a second upper limit, the punch physically blocks a piercing or clinch nut from entering a working space of the punch.

In accordance with yet another feature of the present invention, a further locking means is provided for maintaining the locking pin in a set position, thereby precluding the locking pin from being shifted from the first to the second upper limit and vice versa during an operation of the press.

According to a further feature of the present invention, a nut supply chute, the holding block, the guide post and a nut supply chute connector means are all interconnected and held in a given position by the locking pin with means being provided for permitting the nut supply chute, holding block, guide post and connector means to be removed as a unit from the punch section of the nut assembling arrangement.

Accordingly, it is an object of the present invention to provide a piercing or clinch nut assembling arrangement which avoids by simple means the shortcomings and drawbacks encountered in the prior art.

Another object of the present invention resides in providing a piercing or clinch nut assembling arrangement by which an assembly of the piercing or clinch nuts can be effected in a completely automatic manner.

A further object of the present invention resides in providing a piercing or clinch nut assembling arrangement wherein a supply of the piercing or clinch nuts to the nut assembling arrangement is automatically terminated upon a termination or suspension of operation of other devices of the assembling arrangement.

An additional object of the present invention resides in providing a piercing or clinch nut assembling arrangement which functions reliably under all operating conditions.

Yet another object of the present invention resides in providing a piercing or clinch nut assembling arrangement which is simple in construction and, therefore, inexpensive to manufacture.

These and other objects, features and advantages of the present invention will become more apparent from the following description when taken in connection with the accompanying drawings which show, for the purposes of illustration only, one embodiment in accordance with the present invention, and wherein:

FIG. 1 is a schematic view of a piercing or clinch nut assembling arrangement in accordance with the present invention mounted at a press together with other stamping dies;

FIG. 3 is a partial cross-sectional view showing the interrelationship between a punch, punch holder, self-piercing or clinch nut, metal panel and swaging die during a punching operation;

Figure 2:
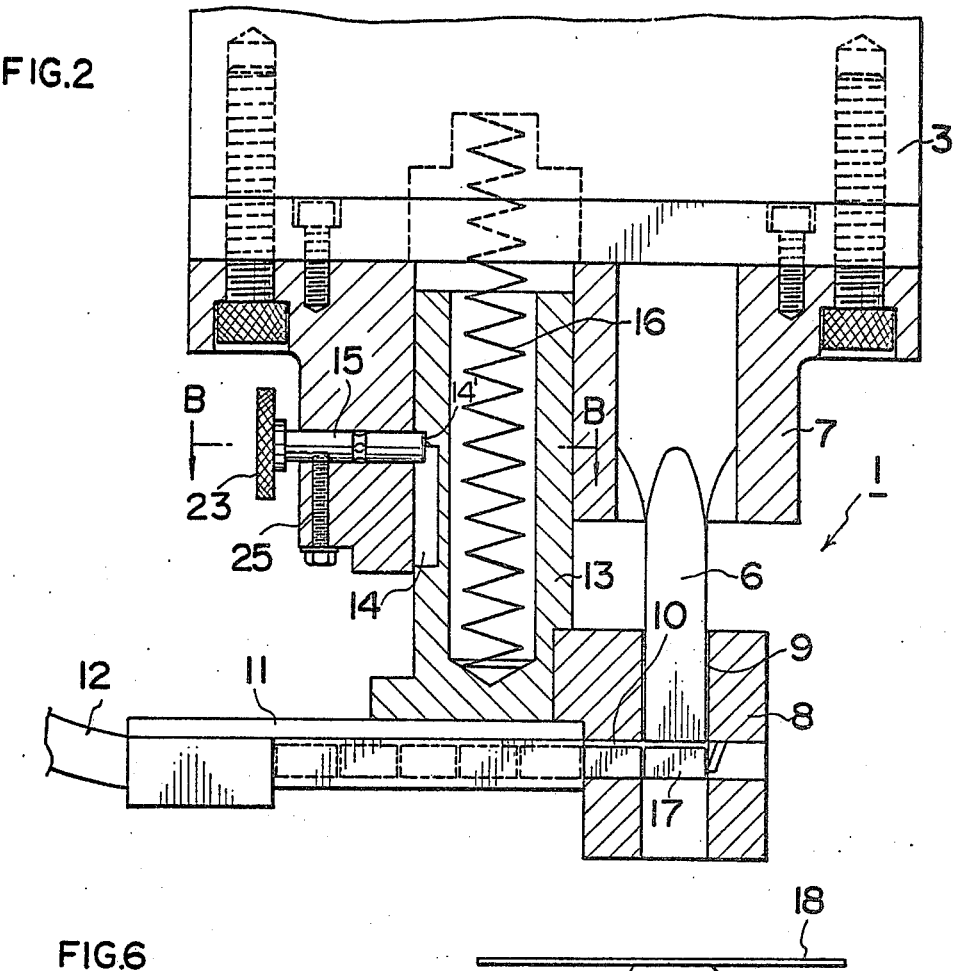
FIG. 2 is a cross-sectional view, on an enlarged scale, taken along the line A—A in FIG. 1.

Referring now to the drawings wherein like reference numerals are used throughout the various views to designate like parts and, more particularly, to FIG. 1, according to this figure, a piercing nut assembling arrangement generally designated by the reference numeral 1 is mounted on a press or pressing machine together with other stamping dies generally designated by the reference numerals $2_1$, $2_2$, and $2_3$ with the punch section of the assembling device being fixed to a press ram 3 and with a swaging die 5 being fixed to a base plate 4 of the press.

As shown most clearly in FIG. 2, the portion of the assembling device mounted at the punch section of the press includes a punch 6 mounted on the ram 3 by a punch holder 7 with the punch 6 being moved up and down in a bore 9 provided in a holding block 8. The holding block 8 is provided with a nut supply passage 10 which intersects the bore 9 at a right angle. The nut supply passage 10 feeds self-piercing or clinch nuts 17 one-by-one into the holding block 8 by way of a supply chute or hose 12 supported by a connector member 11. The individual piercing or clinch nuts 17 are delivered to a space produced at the intersection of the bore 9 and the supply passage 10. The manner of advancing or delivering the piercing or clinch nuts 17 through the supply chute or hose is disclosed more fully in U.S. patent application Ser. No. 859,592, the disclosure of which is incorporated herein by reference to the extent necessary in understanding the present invention.

The holding block 8 is fixed to a guide post 13 which is maintained in slidable contact with the punch holder 7 so as to effect a unitary movement of the guide post 13 and the holding block 8 with respect to the punch holder 7. The guide post 13 is provided with a groove 14 at a side thereof opposite a side facing the punch holder 7. The groove or recess 14 receives or accommodates a locking pin 15 and serves to limit the vertical movement of the guide post 13 over the range of the axial length of the groove 14. The guide post 13 houses or accommodates a coil spring 16 which normally urges or biases the guide post 13 in a downward direction with respect to the punch holder 7.

As shown most clearly in FIG. 3, when the ram 3 is lowered, the punch section as a whole is lowered until the holding block 8 comes into contact with a metal panel 18 placed on a swaging die 5. When the holding block 8 comes into complete contact with the metal panel 18, only the punch 6 is further lowered in the course of which the pilot portion of the piercing or clinch nut 17, held in the bore 9 of the holding block 8, is forced into the metal panel 18 so as to pierce an aperture therein. The metal panel 18 is further lowered by continued movement of the ram 3 and punch 6 until it is in engagement with the top surfaces of the flanges of the piercing or clinch nuts 17. When the panel 18 is completely received by the flanges of the piercing or clinch nuts 17, the swaging edges 5' of the swaging die 5 swage the metal of the metal panel 18 around the aperture already punched by the pilot portion of the piercing or clinch nuts 17, thereby enabling the nuts 17 to anchor in the metal panel 18 in a manner more fully described in U.S. Pat. Nos. 2,749,606, 3,152,628 and 3,704,507, and the commonly owned U.S. patent application Ser. No. 325,049.

Figure 4:
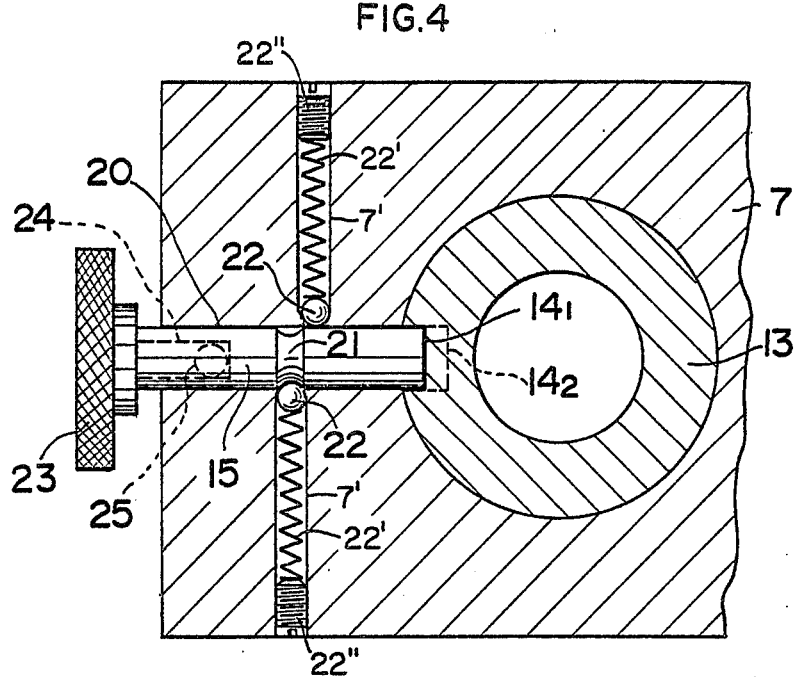
FIG. 4 is a cross-sectional view, on an enlarged scale, taken along the line B—B in FIG. 2.

As shown most clearly in FIG. 4, the punch holder 7 is provided with at least two bores 7' which are staggered as viewed in an axial direction of the locking pin 15. A spring element such as, for example, a coil spring 22', is accommodated in each of the bores 7' with one end of each of the springs 22' abutting or engaging an abutment element such as, for example, a threaded element 22" with the other end of the respective springs 22' engaging ball elements 22 so as to normally bias the ball elements 22 into engagement with the locking pin 15.

The groove 14 receiving the locking pin 15 is provided with a step 14' which divides the groove 14 into two sections $14_1$, $14_2$ of different depths so as to define two upper limits for the locking pin 15 which may be received in either section $14_1$ or $14_2$ of the groove 14 as desired.

The pin 15 is slidably held in a bore 20 provided in the holder 7 with a ring-shaped groove 21 being provided around a central shank portion of the pin 15. The ring-shaped groove 21 is adapted to alternatively receive the balls 22 so as to define or determine a degree of insertion of the pin 15 into the groove 14.

In use, a knob 23 is employed to adjust the position of the locking pin 15 relative to the two sections $14_1$, $14_2$ of the groove 14. When the desired position of the locking pin 15 is attained, the locking pin 15 is locked by a suitable locking device such as, for example, a bolt 25 received in a recess 24 provided in an undersurface of the locking pin 15.

In a normal operation of the assembling arrangement, the locking pin 15 is inserted and locked by the bolt 25 in the section $14_1$, thereby setting the assembling arrangement for operation at the higher upper limit, shown most clearly in FIGS. 2 and 4. In this position, the piercing or clinch nuts 17 are delivered from the nut supply passage 10 to a position beneath the punch 6.

Figure 5:
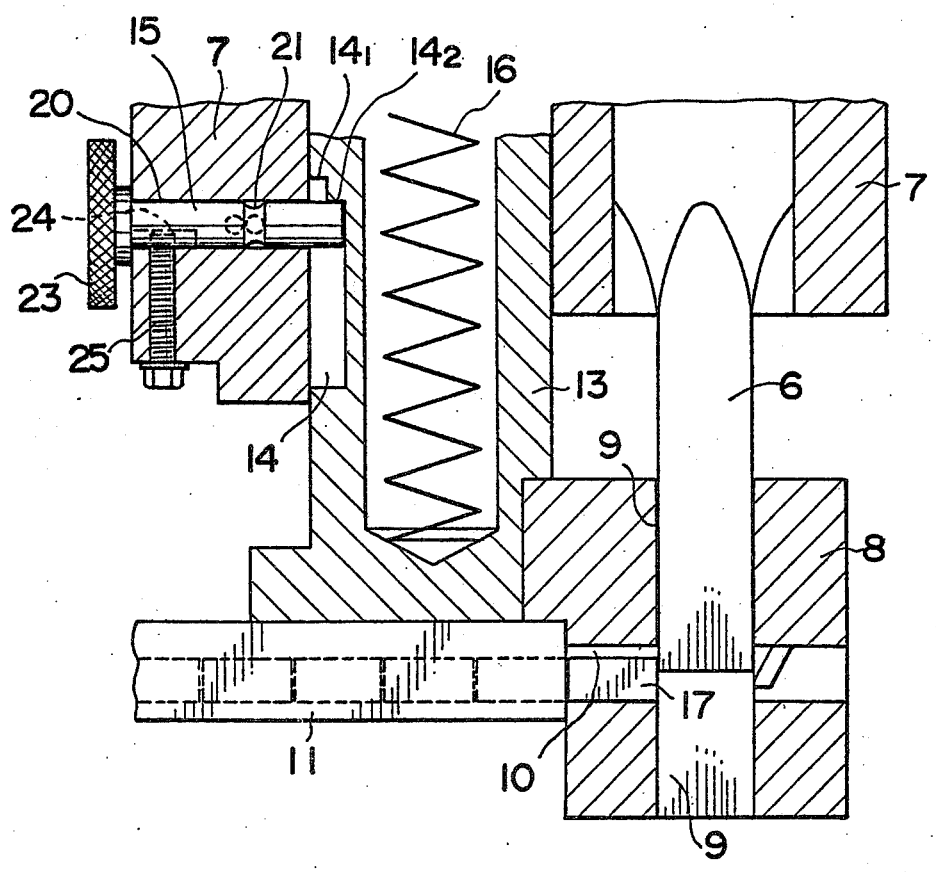
FIG. 5 is a cross-sectional view similar to FIG. 2 showing the blocking of a supply of piercing or clinch nuts by a punch in accordance with the present invention.

When the locking pin 15 is inserted and locked by the locking bolt 25 in the section $14_2$, the lower upper limit is obtained so that the holding block 8 will be raised relative to the punch 6 to a position shown most clearly in FIG. 5, whereby the punch 6 is located at such a position so as to block the nut 17 from entering the bore 9. At this position, even when the ram 3 is lowered, the nut 17 is free from any pressure exerted by the punch 6, which punch is allowed to pass the nut 17 without having any engagement therewith.

Figure 6:
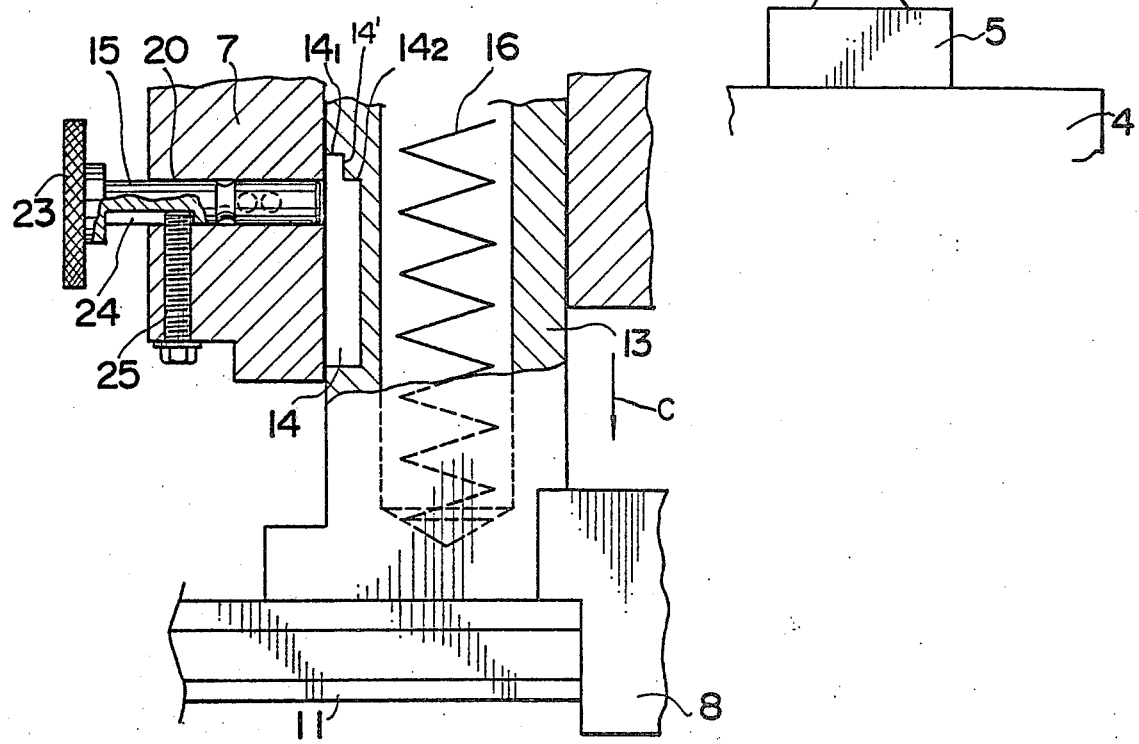
FIG. 6 is a partial cross-sectional view of the punch section of a piercing or clinch nut assembling arrangement with a locking pin in a release position.

As shown most clearly in FIG. 6, the recess 24 in the undersurface of the locking pin 15 is elongated and has an axial length such that the locking pin 15 can be withdrawn completely from the groove 14, thereby enabling the interconnected holding block 8, supply chute or hose 12 and connector member 11 to be removed as a whole unit from the punch holder 7 in the direction of the arrow C.

While I have shown and described only one embodiment in accordance with the present invention, it is understood that the same is not limited thereto, but is susceptible of numerous changes and modifications as known to a person skilled in the art, and I therefor do not wish to be restricted to the details shown and described herein, but intend to cover all such changes and modifications as are encompassed by the scope of the appended claims.

I claim:

1. An automatic piercing nut assembling arrangement comprising:
   a punch means slightably supported in a punch holder connected to a press ram for pressing a piercing nut into a metal panel;
   a swaging dye means arranged opposite said punch means and cooperating therewith for swaging metal from the metal panel inwardly of the piercing nut to anchor the same in the metal panel;
   means interposed between said punch means and said swaging dye means for holding a piercing nut in a punching path of said punch means, including a holding block having a bore means for receiving a piercing nut, said bore means having a sufficient dimension so as to permit said punch means to pass therethrough during a downward movement of said press ram;
   means for supplying piercing nuts to the holding means including a nut supply passage means provided in said holding block for receiving a continuous supply of piercing nuts, and a nut supply chute means for supplying nuts to said nut supply passage means from a nut storage means;
   means operatively connected with said holding means for causing said punch means to stop a supply of piercing nuts to the holding means by said punch means physically blocking the piercing nuts during predetermined working conditions of the piercing nut assembling arrangement; and
   a post means operatively connected with the holding block and slightably supported at the punch holder for guiding a movement of said holding block relative to said punch means.

2. An arrangement according to claim 1, wherein said means for causing a stop in a supply of piercing nuts includes means cooperable with said post means for adjusting a position of the holding block relative to said punch means.

3. An arrangement according to claim 2, wherein said adjusting means includes a locking pin retractably inserted in a bore of the punch holder, and an axially extending recess means provided in said post means for accommodating said locking pin, said recess means being provided with a step portion dividing the recess means into two sections of a different depth with respect to a longitudinal axis of the post means, the first of said two sections having a relatively shallow depth and the second of said two sections having a greater depth than said first section, said locking pin being receivable in either of the two sections, thereby enabling the post means to raise or lower the holding block relative to said punch means.

4. An arrangement according to claim 3, wherein a locking means is provided for locking said locking pin in either the first or second section of the recess means.

5. An arrangement according to claim 4, wherein said locking means includes a bolt means arranged in the punch holder for engaging an undersurface of the locking pin.

6. An arrangement according to claim 5, wherein said locking means includes a recess provided in the undersurface of the locking pin for accommodating an end of said bolt means.

7. An arrangement according to claim 6, wherein said recess has an axial length which permits said locking pin to be completely withdrawn from said recess means in the post means.

8. An arrangement according to claim 7, wherein a connector means is provided for connecting the nut supply chute means to said holding block.

9. An arrangement according to claim 8, wherein means are provided for normally biasing said post means in a downward direction with respect to the punch holder.

10. An arrangement according to claim 9, wherein means are provided for determining a degree of insertion of said locking pin.

11. An arrangement according to claim 10, wherein said last-mentioned means includes a ring-shaped groove provided around a central shank portion of said locking pin, and biased detent means cooperable with said ring-shaped groove.

12. An arrangement according to claim 1, wherein said detent means includes at least a pair of ball elements arranged in bores of the punch holder and spring means for normally biasing said ball elements toward said locking pin, said ball elements being arranged in an alternating fashion, as viewed in an axial direction of the locking pin, so that only one ball element at a time engages the ring-shaped groove.

13. An arrangement according to claim 3, wherein means are provided for determining a degree of insertion of said locking pin.

14. An arrangement according to claim 13, wherein said last-mentioned means includes a ring-shaped groove provided around a central shank portion of said locking pin, and biased detent means cooperable with said ring-shaped groove.

15. An arrangement according to claim 14, wherein said detent means includes at least a pair of ball elements arranged in bores of the punch holder and spring means for normally biasing said ball elements toward said locking pin, said ball elements being arranged in an alternating fashion, as viewed in an axial direction of the locking pin, so that only one ball element at a time engages the ring-shaped groove.

16. An automatic piercing nut assembling arrangement, comprising:
   a punch means slightably supported in a punch holder connected to a press ram for pressing a piercing nut into a metal panel;
   a swaging dye means arranged opposite said punch means and cooperating therewith for swaging metal from the metal panel inwardly of the piercing nut to anchor the same in the metal panel;
   means interposed between said punch means and said swaging dye means for holding a piercing nut in a punching path of said punch means;
   means for supplying piercing nuts to the holding means;
   means operatively connected with said holding means for causing said punch means to stop a supply of piercing nuts to the holding means by said punch means physically blocking the piercing nuts during working conditions of the piercing nut assembling arrangement;

a post means operatively connected to said holding means for guiding a movement of said holding means relative to said punch means; and said means for causing a stop in a supply of piercing nuts includes means cooperable with said post means for adjusting a position of the holding means relative to said punch means.

17. An arrangement according to claim 16, wherein said adjusting means includes a locking pin retractably inserted in a bore of the punch holder, and an axially extending recess means provided in said post means for accommodating said locking pin, said recess means being provided with a step portion dividing the recess means into two sections of a different depth with respect to a longitudinal axis of the post means, the first of said two sections having a relatively shallow depth and the second of said two sections having a greater depth than said first section, said locking pin being receivable in either of the two sections, thereby enabling the post means to raise or lower the holding means relative to said punch means.

18. An arrangement according to claim 17, wherein a locking means is provided for locking said locking pin in either the first or second section of the recess means.

19. An arrangement according to claim 18, wherein means are provided for normally biasing said post means in a downward direction with respect to the punch holder.

20. An arrangement according to claim 19, wherein means are provided for determining a degree of insertion of said locking pin.

21. An arrangement according to claim 20, wherein said last-mentioned means includes a ring-shaped groove provided around a central shank portion of said locking pin, and biased detent means cooperable with said ring-shaped groove.

* * * * *